UNITED STATES PATENT OFFICE.

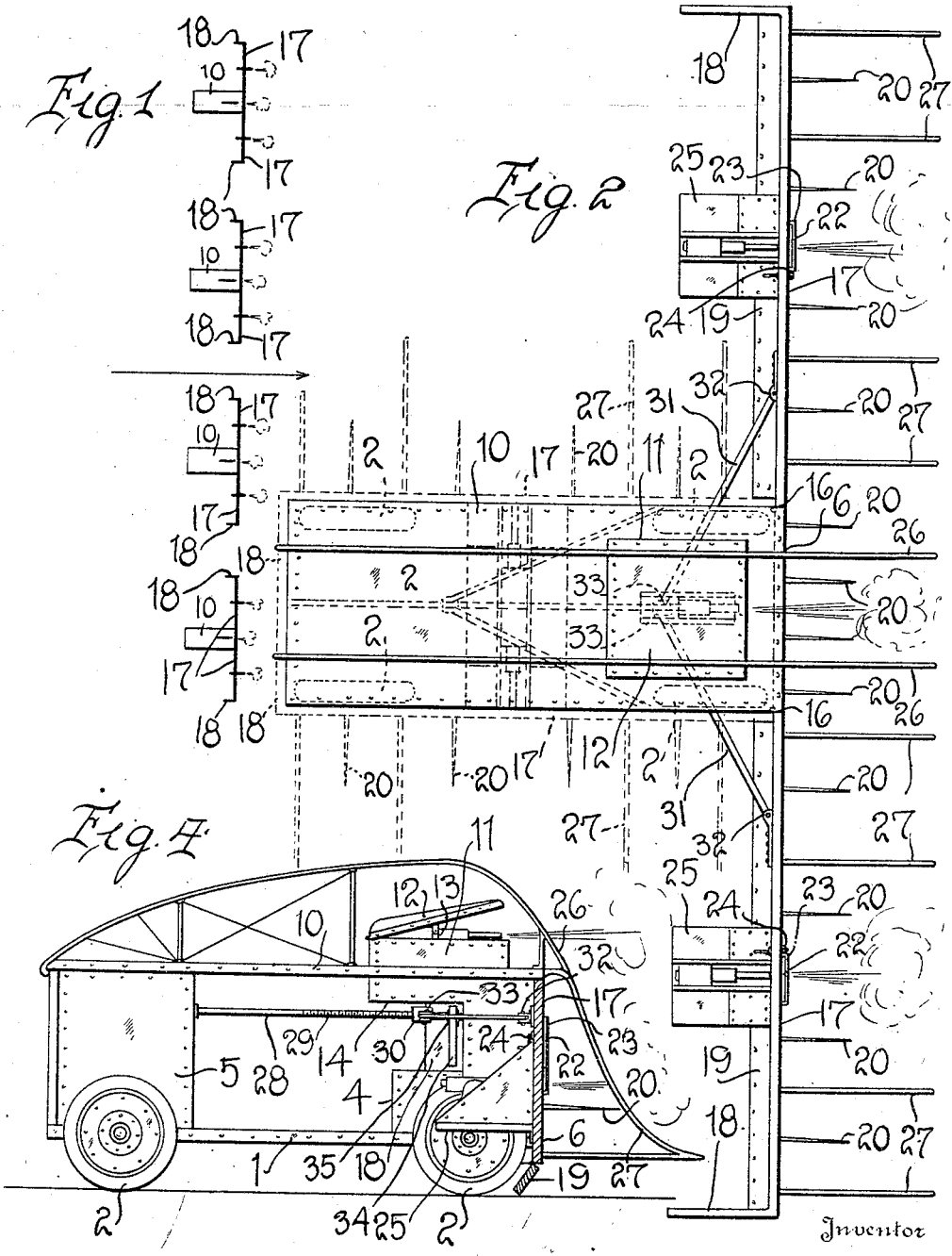

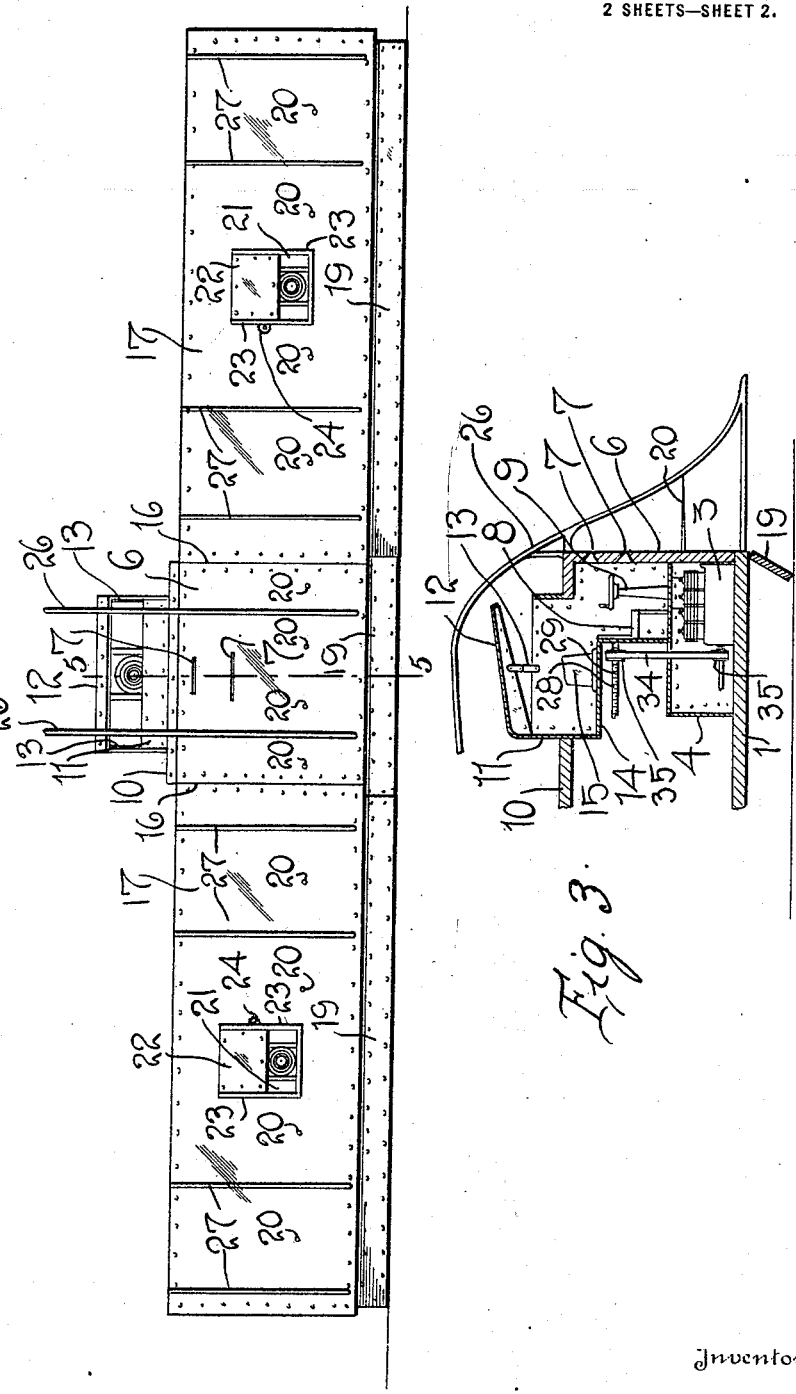

WILLIAM H. DOYLE, OF BROOKLYN, NEW YORK.

ARMORED MILITARY TRUCK.

1,150,748.  Specification of Letters Patent.  Patented Aug. 17, 1915.

Application filed March 13, 1915.  Serial No. 14,182.

*To all whom it may concern:*

Be it known that I, WILLIAM H. DOYLE, a citizen of the United States, and resident of Brooklyn, in the county of Kings and State of New York, have invented certain new and useful Improvements in Armored Military Trucks; and I do hereby declare the following to be a full, clear, and exact description of the invention, such as will enable others skilled in the art to which it appertains to make and use the same.

My invention relates to an improved armored military truck for service in the field of battle.

One of the principal objects of my invention is the provision of means on the truck to present a solid embattlement of steel to shield a body of men concealed there-behind.

Another feature of my invention is the provision of a plurality of rapid fire guns mounted on the armor of the truck in such a manner as to be effective against the enemy and yet positioned so that the operators will be completely shielded from sight and protected. And still another novel feature resides in the provision of means for cutting barbed wire and of bayonets on the armor, in position to effectively act against the enemy when hand to hand fighting is in order.

Other features of novelty will be more fully described in connection with the accompanying drawing, forming a part of this specification, and will be more particularly pointed out in and by the appended claims.

Referring to the drawings: Figure 1 is a diagrammatic view of a plurality of trucks constructed according to my invention and arranged in battle formation. Fig. 2 is a top plan view of an armored motor truck constructed as hereinafter set forth. Fig. 3 is a section on the line 5—5 of Fig. 5. Fig. 4 is a side view partly in section of the truck in action. Fig. 5 is a front view of the same.

In the drawings which illustrate one specific embodiment of my invention, 1 designates the usual rectangular frame of a motor truck provided with wheels 2. Mounted upon the frame 1 at the forward end thereof is a power plant 3 inclosed by a casing 4, said power plant being for the usual purpose of driving the motor truck, and for other ulterior purposes to be hereinafter set forth. The frame of the motor truck carries at its rear end a compartment 5 suitably arranged for the storage of such accoutrement as ammunition, tools, etc. At the forward end of the frame 2 is mounted a front plate of steel armor 6. This plate is slotted at 7 to provide sights for the driver of the vehicle, who is preferably located in the seat 8 directly behind this plate 6 so as to be in close proximity to the steering mechanism 9. Over the top of the truck and fastened to the frame thereof is mounted a top protecting plate 10 apertured as shown to permit the projection thereabove of a lookout compartment 11 provided with a hinged top 12 supported by jointed levers 13. Mounted on the floor 14 of this compartment is a gun base 15 and the barrel of the gun, which may be of the automatic type, is arranged so as to be directed and aimed through the open space when the cover 12 of the compartment is raised. The operator of the gun in this compartment may act as a lookout to inform the driver of the vehicle as to the condition of the surface over which he is driving and to direct the movements of the vehicle.

At each vertical edge 16 of the front plate 6 is hingedly mounted a side wing 17. These side wings at their outer end are turned over at right angles as shown at 18. The side wings are movable about the points 16 so as to inclose, shield and protect the sides of the motor truck when these wings are in the position indicated in dotted lines in Fig. 2, the turned-over portions 18 meeting at the rear of the vehicle to protect the same. On the bottom horizontal edges of the front and side wings are drag plates 19. These are hinged so as to fold backwardly thereby providing a covering between the lower edge of the said side wings and front plate and the ground but arranged so that they do not retard forward progress of the vehicle. On the front plate and wings, about the height of the breast line of a person, are provided bayonets 20. The side wings are provided with apertures 21 closed by sliding doors 22 mounted in the tracks 23 and operated by the lever devices 24 of any suitable type. At the rear of the wings and below these apertures are mounted platforms 25 carrying rapid fire guns, arranged forms as to be aimed through the said apertures 21. The platforms 25 serve to support not only the gun but if necessary the operators for each gun. In order to provide means for destroying barbed wire impediments which may be in the path of the moving truck, I provide the gatherers 26 mounted on the front plate and extending over the rear of the truck so as to tear up the wire, roll it up and dispose of it rearwardly of the moving vehicle. To assist these gatherers I provide, on the wings 17, suitably supplementary gatherers 27 which assist in destroying barbed wire arrangements that extend throughout the length of the vehicle when in action.

Of course it will be understood that the wings 17 will be of considerable weight, preferably being constructed of about three inch armor plate. Therefore it will be necessary to provide suitable means for moving these wings into the extended and retracted positions. In order to do this I provide a horizontal shaft 28 threaded at 29 and extending longitudinally and centrally of the truck. Upon this shaft is a threaded collar 30. Each wing 17 is connected to this collar by the connecting rods 31 pivoted to the wings at 32 and to the said collar at 33. It will be seen therefore, that depending upon the direction in which this shaft 28 is rotated, the wings 17 will be moved to the extended position shown in full lines in Fig. 2, or to the position shown in dotted lines in Fig. 2. This shaft may be suitably connected to the power plant 3 by means of the belt 34 running over pulleys 35.

Now in order to use this truck effectively in engagements with the enemy, a number of them are lined up abreast as shown in Fig. 1, with the wings in the extended position. Thus when a charge is ordered the men on foot or horseback behind these guns will be protected from the fire of the enemy during the advance.

Of course the ingenuity of those in command of these trucks will suggest many uses to which they may be effectively put.

While I have herein shown and described one specific form of my invention, I do not wish to be limited thereto except for such limitations as the claims may import.

I claim:

1. The combination with a motor truck including a power plant, a shaft provided with a threaded length and driven by said power plant, movable wings hinged to said truck, a threaded collar on said shaft, and means connecting said wings to said collar for movement when said shaft is rotated.

2. The combination with a motor truck including a power plant, of a shaft driven by said power plant, movable wings hinged to said truck, and means longitudinally movable on said shaft and connected with said wings for moving the latter.

3. The combination with a motor truck including a power plant, of a shaft longitudinally of the truck and driven by said power plant, movable wings hinged to said truck to inclose the sides and back thereof when in one position and to shield a body of men when in another position, and means longitudinally movable along said shaft and in connection with said wings for operating the latter to the positions named.

In testimony whereof, I have signed this specification.

WILLIAM H. DOYLE.

Copies of this patent may be obtained for five cents each, by addressing the " Commissioner of Patents, Washington, D. C."